Aug. 7, 1951     P. F. GARDNER     2,563,599
PIPE LAYOUT DEVICE

Filed June 28, 1946     3 Sheets-Sheet 1

INVENTOR
PETE F. GARDNER.
BY Allen & Allen
ATTORNEYS.

Aug. 7, 1951        P. F. GARDNER        2,563,599
PIPE LAYOUT DEVICE

Filed June 28, 1946        3 Sheets-Sheet 2

INVENTOR.
PETE F. GARDNER.
BY
Allen & Allen
ATTORNEYS.

Aug. 7, 1951 P. F. GARDNER 2,563,599
PIPE LAYOUT DEVICE
Filed June 28, 1946 3 Sheets-Sheet 3
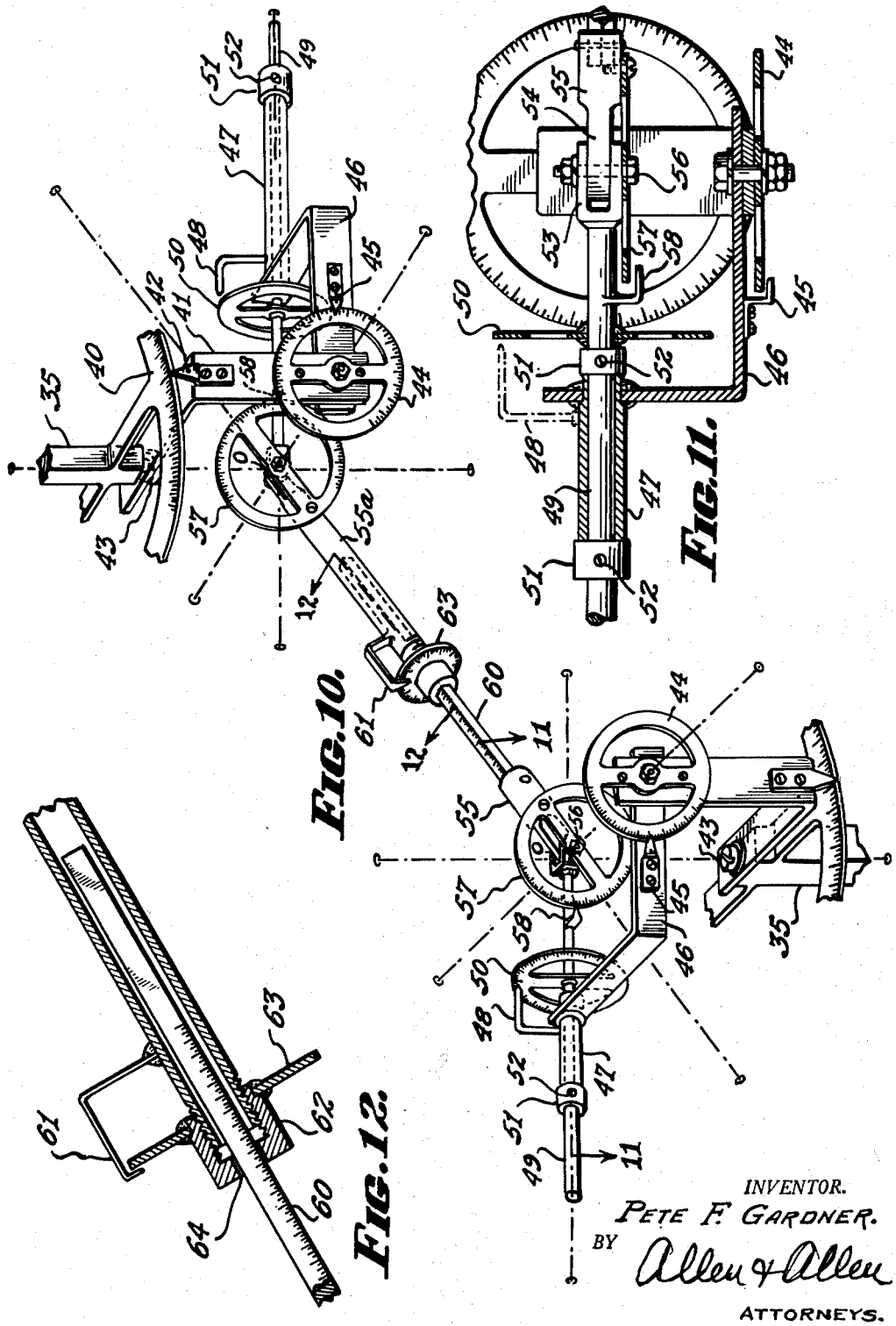
INVENTOR.
PETE F. GARDNER.
BY Allen & Allen
ATTORNEYS.

Patented Aug. 7, 1951

2,563,599

UNITED STATES PATENT OFFICE 2,563,599

PIPE LAYOUT DEVICE

Pete F. Gardner, Middletown, Ohio

Application June 28, 1946, Serial No. 680,035

12 Claims. (Cl. 33—174)

This invention relates to a pipe layout device or to an instrument or measuring device for determining significant factors in a pipe layout.

In the design of a pipe layout it frequently happens that two pipes which are non-parallel and even in non-parallel planes are to be connected together by another section of pipe which will not be parallel to either of the first mentioned sections of pipe and will usually be in a plane containing no more than one of said first mentioned sections. The calculations involved in determining the true length of the connecting section, and the true angles at both joints, and the amounts by which the flanges on the connecting pieces must be rotated in order that the bolt holes in the flanges will match up properly, are extremely complex and very tedious of solution. There is, of course, a tremendous possibility for the introduction of errors.

It is important that when the pipe sections are cut and the flanges are welded on, that the various sections fit together properly on location.

It is, therefore, an object of my invention to provide an apparatus whereby the significant factors involved can be easily determined without the necessity of going through a long and involved mathematical computation. It is another object of my invention to provide a device of the character described by means of which these significant factors can be determined in a minimum of time by reading directly off appropriate measuring devices, i. e. scales and protractors.

It is a further object of my invention to provide such a device by means of which a relatively untrained individual can determine the significant data without having knowledge of geometry or trigonometry, and whereby such determination is absolutely free of error. Further objects of my invention include the provision of a device as outlined above which will be relatively inexpensive to construct, simple to operate, and versatile in use.

These and other objects of my invention which will be pointed out in more detail hereinafter or which will be apparent to one skilled in the art upon reading these specifications, I accomplish by that certain construction and arrangement of parts of which I shall now describe an exemplary embodiment.

Reference is made to the drawings forming a part hereof, wherein:

Figure 10 is a detailed perspective view of a portion of the device with the framework removed to more clearly show the operation.

Figure 11 is a cross sectional view on an enlarged scale taken on the bend line 11—11 of Figure 10.

Figure 12 is a partial cross sectional view on an enlarged scale taken on the line 12—12 of Figure 10.

Figure 1:
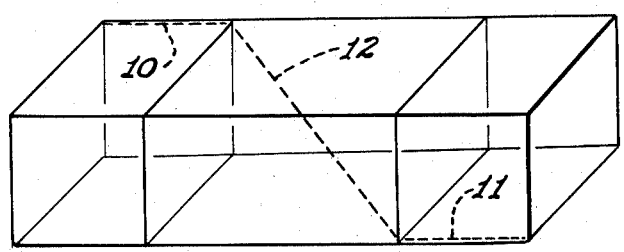
Figures 1, 2 and 3 show diagrammatically three different problems which may be solved by my invention.
Figure 2:
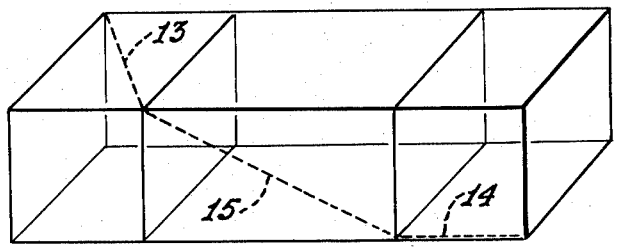
Figure 3:
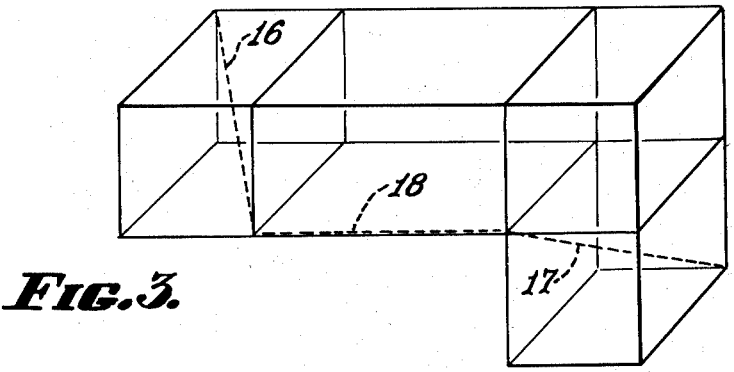

In Figures 1, 2, and 3, I have shown some of the types of problems included in pipe layout design and which can easily be solved by the apparatus of my invention. In Figure 1, a section of pipe 10 and a section of pipe 11 are connected by a section 12. The pipe sections are indicated by the broken lines placed within imaginary framework to more clearly give the illusion of depth. In Figure 1, the sections 10 and 11 are parallel and are not in the same vertical plane.

In Figure 2, I have shown a situation where a section 13 and a section 14 which are not in a common plane are connected by a section 15. In this case, the sections 14 and 15 are not in a common plane. In Figure 3, I have shown a more complicated situation where the sections 16 and 17 which are not in a common plane are connected by a section 18.

These three situations are only exemplary of the types of problems encountered daily in the design of pipe layouts, and which involve rather lengthy and complex calculations.

Figure 4:
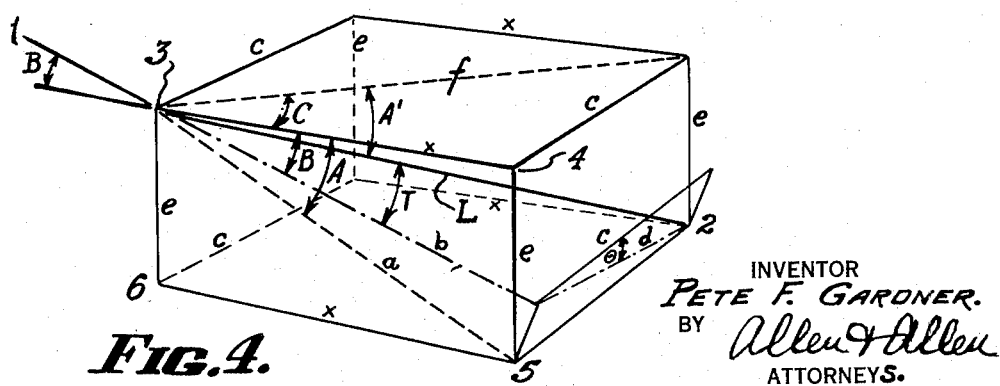
Figure 4 is a perspective diagram and illustrates the calculations involved in a pipe layout problem.

In Figure 4, I have shown diagrammatically in perspective a situation where two sections of pipe 1—3 and 3—2 are to be joined at the point 3. The angle B is the vertical angle of the section approaching the point 3, which for purposes of calculation may be considered as plus when above the horizontal and minus when below. The section 1—3 is in the plane 3, 4, 5, 6 so the angle B between the edge 4, 3 of the rectangular parallelepipedon and the line b (1— produced) is equal to the vertical angle of the approaching section.

The line $a$ represents the horizontal projection of the section L and the angle A represents the verticle angle ahead of the bend in the plane of the angle B. This angle also is taken as plus when above the horizontal and minus when below. The angle A' represents the vertical angle ahead of the bend, but in the plane which is at an angle C with the plane of the angles A and B. Similarly, this angle is taken as plus when above the horizontal and minus when below. The line $f$ represents the vertical projection of the section L and the angle A' is in the plane containing the lines $f$ and L.

The angle C mentioned above is the dihedral angle between the plane 3, 4, 5, 6 and the plane $f$, $e$, L. The angle T is the true angle of the bend measured in the plane containing both sections of pipe, i. e. the plane containing the lines $b$, $d$, L.

The angle O is the angle of rotation in the flange and L is the length along a center line of the pipe section from the point 3 to the point 2.

The calculations are so lengthy and complex that the introduction of errors is very likely. Therefore, briefly, in the practice of my invention, I provide a mechanical apparatus by means of which the pipe layout which is to be designed can be set up to scale and the various section factors can be read off directly.

Figure 8:
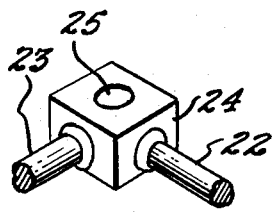
Figure 8 is a partial perspective view on an enlarged scale of one of the corner members of the device.
Figure 6:
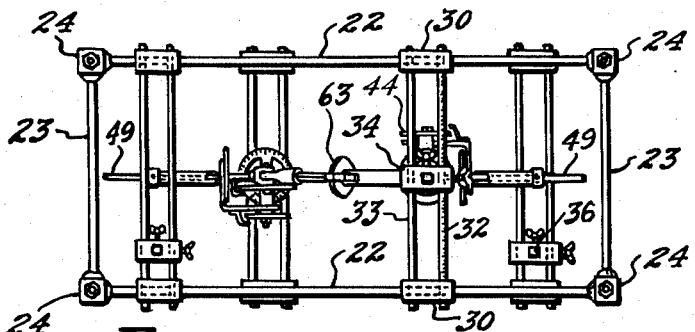
Figure 6 is a plan view of the same.
Figure 7:
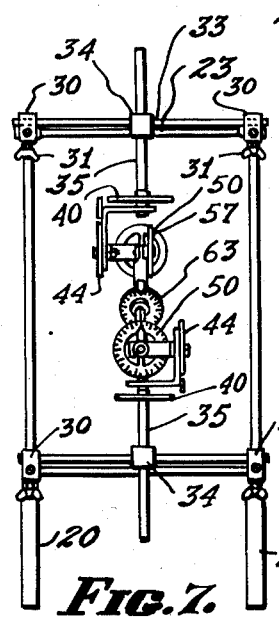
Figure 7 is a cross sectional view taken on the line 7—7 of Figure 5.
Figure 5:
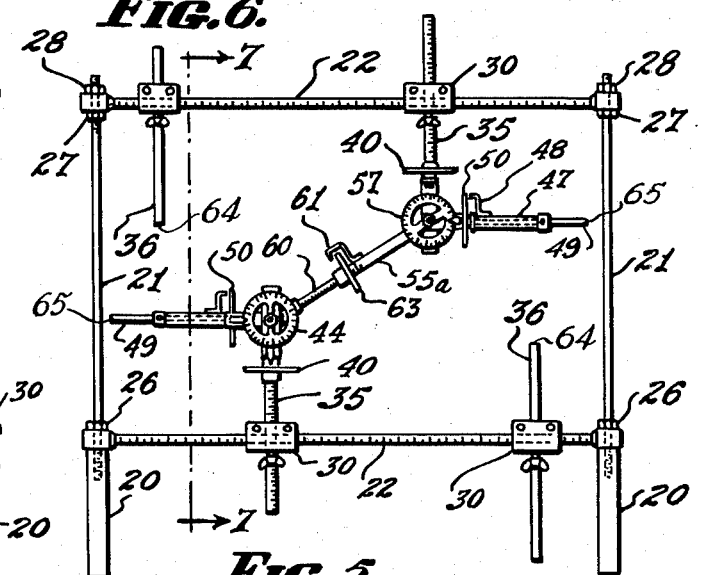
Figure 5 is a side elevational view of an apparatus according to my invention.

In the Figures 5, 6, and 7, I have shown a framework which may be made primarily of rods defining a rectangular parallelepipedon. The device is provided with four legs 20 which carry vertical frame elements 21. These may be threaded into the members 20, if desired. I provide upper and lower rectangular frames which are identical and comprise the side rods 22 and the end rods 23, which are preferably welded into corner blocks 24 as shown in detail in Figure 8. The corner blocks are provided with holes 25 by means of which they may be mounted on the vertical rods 21. The lower rectangular framework may be held in place on the legs 20 by the lock nuts 26 and at the upper end the corner blocks 24 may be held by the nuts 27 and 28 threaded onto the rods 21 so that the upper framework may be adjusted for strict parallelism with the lower frame.

Figure 9:
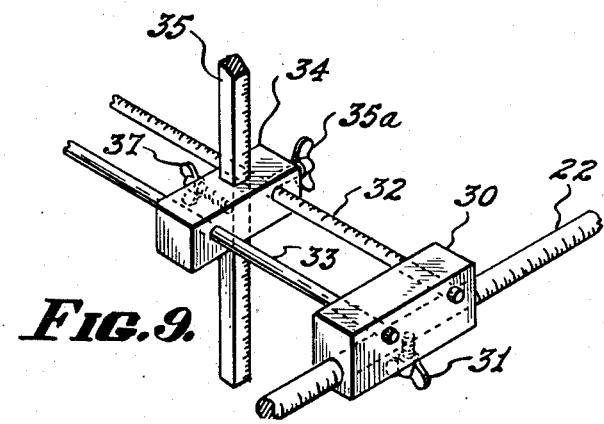
Figure 9 is a partial perspective view on an enlarged scale of a portion of the apparatus.

In order to be able to set up a problem on the apparatus, it is necessary to be able to locate two points in space by means of their rectangular coordinates. For this purpose I provide a series of carriages which will now be described. I prefer to provide two carriages on the top parallel rails 22 and two carriages on the lower parallel rails 22. Each of these carriages consists of two blocks shown more clearly in Figure 9. Each block indicated at 30 is provided with a bore for the passage of the rail or rod 22, and the block 30 may be fixed in any desired position on the rail 22 by means of the wing nut 31. The two blocks 30 of the carriage are connected by means of rails 32 and 33. The rails 22 are preferably graduated so that the $x$ coordinates of the points in space may be set up to scale by loosening the wing nuts 31 and sliding the blocks 30 along the rails 22 to the desired position and then locking the wing nuts 31.

A block 34 having two bores to accept the rods 32 and 33 is mounted for movement transverse to the rails 22 and the block 34 may be fixed in any desired position by means of the wing nut 35a. The rod 32 is preferably graduated so that the $z$ coordinate can be determined by loosening the wing nut 35a, sliding the block 34 to the desired position and locking the wing nut 35a.

Each of the blocks 34 is provided with an aperture to accept a graduated rod 35 or 36 and the rods 35 and 36 can be fixed in position by means of the wing nuts 37. By adjustment of the rods 35 and 36 and fixing them in position by means of the wing nuts 37, the $y$ coordinates of the point may be fixed. It should be noted that having two parallel sets of rails 22 with carriages on both sets, it is possible to permit the points whose position in space is being determined, to bypass each other so that all problems can be solved directly. The carriages could be in the same plane on the same set of rails, but in this case there would be a limit to the problems which could be solved because the two points to be determined could not bypass each other and there would be a 180° limit incorporated into the device. With the design shown, it is possible to solve any problem through a 360° range.

Fixed to the bars 35 are the protractors 40 which are in a horizonal plane. The indexes for these protractors are carried on brackets 41 as indicated at 42. The brackets 41 are fastened by means of a screw or the like 43 to the rods 35 so that the brackets 41 may be turned in relation to the rods 35 and the horizontal angle may be read off the protractor 40 opposite the index 42.

Protractors 44 are fastened to the brackets 41 and the indexes 45 for these protractors are mounted on brackets 46 which are pivoted to the brackets 41 on the axis of the protractors 44, which axis intersects the axis of the rod 35 and its protractor 40 at the point O, whose position is to be fixed. By means of the index 45 and the protractor 44, the vertical angle ahead of the bend may be measured.

The bracket 46 carries a sleeve 47 which is aligned so that its axis also intersects the point O, and the sleeve 47 carries an index 48 fixed thereto. Within the sleeve 47, a rod 49 is free to turn and has fastened to it the protractor 50. The rod 49 is pivoted for axial movement by the collars 51 with the set screws 52. As the rod 49 turns within the sleeve 47, the angle of rotation can be read on the protractor 50 opposite the index 48. This angle represents the angle of rotation of the flanges of the approaching section of pipe.

The end of the rod 49 is provided with a fork 53 within which a tongue 54 in the end of the member 55 is pinned at 56. This construction constitutes a sort of universal joint whereby any movement of the members 49 and 55 changing the angle between them while changing the plane of either of them will produce a rotation of the other of said members. Fastened to the member 55 and pivoted at 56 is a protractor 57 which cooperates with an index 58 fastened to the member 49. It will be noted that the protractor 57 will always be in a plane parallel to a plane containing the members 49 and 55 and therefore the protractor 57 measures the true angle of the bend in the plane of both sections of the pipe. Up to this point, the two measuring heads are substantially identical. However, the member 55 of the left hand head as seen in Figure 10 is slightly different from the member 55a which occupies a corresponding position on the right hand head of Figure 10. A graduated bar of square cross section indicated at 60 is securely fastened to the member 55. The member 55a is tubular and of greater length and has fastened to it an index 61. The end of the member 55a is threaded and a nut 62 having fastened to it securely a protractor 63 is threaded onto the threaded end of the member 55a. The nut 62 is provided with a square aperture 64 for the passage of the rod 60. The distance between the points O can be measured on the scale provided on the bar 60 and the angle of twist between the member 60 and the member 55a can be read opposite the index 61 on the protractor 63 as the member 60 rotates. The protractor 63 is caused to turn because of the square aperture 64 coacting with the square rod 60. The rotation occurs on the threads on the members 62 and 55a respectively. But since the angle of twist is never very great, no substantial error in the length O, O is introduced by this construction.

The use of the above described device will be apparent from the following description. To set up a problem on the device, the rods 49 representing the two sections of pipe to be joined must first be placed in the correct spaced relationship to simulate the positions of the actual sections of pipe. To do this, the first step is to set the x, y, and z coordinates of the two points to be joined. The blocks 30 are adjusted along the rails 22 and located in the positions shown on the elevational view of the pipe layout to give the x coordinate. The blocks 34 are then adjusted along the rails 32 and 33 to the positions shown on a plan view of the pipe layout to give the z coordinates. The y coordinates are set by adjusting rods 35 vertically by means of the wing nuts 37 on the blocks 34. The foregoing adjustments determine the points O; that is, the ends of the two sections of pipe to be joined. The next step is to set the angles at which the sections of pipe approach the points O. The horizontal angles may be set from the plan view by means of the protractors 40 and indexes 42, and the vertical angles from the elevational view by means of the protractors 44 and indexes 45. By virtue of the connections between the members representing pipe sections described above, the true angles of the bends may be measured on the protractors 57 cooperating with indexes 58. It will be remembered that each protractor 57 lies in a plane parallel to the plane of its related members 49 and 55, and therefore, measures the true angle between those members. The angles of revolution of the flanges are measured by means of the protractors 50 and indexes 48. In this connection, it will be remembered that any movement changing the plane of either member will produce rotation of the other. Finally, the angle of twist (the angle of revolution of the center of the connecting element) can be read on the protractor 63 mounted to revolve with the member 55 and the rod 60. Index 61 is mounted to revolve with the member 55a, whereby the angle of twist may be read if either the member 55 or the member 55a is rotated. The length of the diagonal can be read off directly from the scale provided on the rod 60. The points O, O can be set up by using the scales on the rails 22, 32, and 35, and for convenience, the true dimensions may be scaled down or up to a suitable figure.

It should be noted that the vertical angle at either end of the three line series as measured on the protractors 44 must be set when the protractors 44 and, therefore, the sections 49 are parallel to the side plane of the apparatus. Therefore, if it is also necessary to set in a horizontal angle for the members 49 as measured on the protractors 40, then the vertical angle previously set will no longer be the true vertical angle. It is for this reason that the additional blocks 30 were provided on the top and bottom rails 22. It will be noted that the supplementary carriages are provided only with the vertical rods 36 which are suitable graduated. Having set the vertical angles with the members 49 in a plane parallel to the side plane of the apparatus, the rods 36 are adjusted so that the ends 64 thereof touch the members 49 short of the ends thereof. Then after the horizontal angle is introduced, the rods 36 are moved along their rails in a direction normal to the side plane of the apparatus to the new position of the members 49, and the members 49 are adjusted in a vertical plane to again touch the rods 36, and thus reestablish the vertical projection of the angle as originally set in. In this manner, the vertical angle is reproduced as it would show in an elevational view of the layout.

It will be clear that numerous modifications may be made in details of structure without departing from the spirit of my invention and I, therefore, do not intend to limit myself in any manner except as pointed out in the claims which follow.

Having now fully described my invention, what I claim as new and desire to secure by Letters Patent is:

1. In an instrument for visualizing and determining significant factors in a pipe layout, means representing the longitudinal center lines of two spaced pipe sections, two elements in telescoping relation and axially rotatable with respect to each other representing the longitudinal center line of a single straight line pipe section connecting said first mentioned pipe sections, each of said elements being connected to one of said first mentioned means by a hinged joint pivotable only in the plane defined by said means and element, bearing means for rotatably supporting each of said first mentioned means, means for fixing said bearing means in a predetermined angular position in space, and an adjustable support for each of said last mentioned means to support the respective first mentioned means in any desired position.

2. In an instrument according to claim 1, a protractor and an index, secured one to one of said supports and one to the respective one of said first mentioned means to measure the vertical angle of the longitudinal center line of said respective first mentioned means, the axis of said protractor passing through the intersection of the longitudinal center lines of said connecting section and said respective first mentioned means.

3. In an instrument according to claim 1, a protractor and an index, secured one to one of said supports and one to the respective one of said first mentioned means to measure the horizontal angle of the longitudinal center line of said respective first mentioned means, the axis of said protractor passing through the intersection of the longitudinal center lines of said connecting section and said respective first mentioned means.

4. In an instrument according to claim 1, a protractor and an index, secured one to one of said bearing means and one to the respective one of said first mentioned means to measure the angle of rotation of the longitudinal center line of said respective first mentioned means, the axis of said protractor passing through the intersection of the longitudinal center lines of said connecting section and said respective first mentioned means.

5. In an instrument according to claim 1, a protractor and an index, secured one to one of said elements and one to the adjacent one of said first mentioned means for measuring the true angle between said first mentioned means and said element.

6. In an instrument according to claim 1, a protractor and an index, secured one to one of the said elements and one to the other of said elements to measure the angle of twist of said connecting pipe section.

7. In an instrument according to claim 1, a scale associated with one of said elements and an index associated with the other of said elements to measure the length of said connecting section.

8. In an instrument according to claim 1, a protractor and an index, secured one to one of said supports and one to the respective one of said first mentioned means, another protractor and an index secured one to the other of said supports and one to the other respective one of said first mentioned means, to measure the vertical angles of the longitudinal center lines of said respective first mentioned means, the axes of said protractors passing respectively through the intersections of the longitudinal center lines of said connecting section and said respective first mentioned means.

9. In an instrument according to claim 1, a protractor and an index, secured one to one of said supports and one to the respective one of said first mentioned means, another protractor and an index secured one to the other of said supports and one to the other respective one of said first mentioned means, to measure the horizontal angles of the longitudinal center lines of said respective first mentioned means, the axes of said protractors passing respectively through the intersections of the longitudinal center lines of said connecting section and said respective first mentioned means.

10. In an instrument according to claim 1, a protractor and an index, secured one to one of said bearing means and one to the respective one of said first mentioned means, another protractor and an index secured one to the other of said bearing means and one to the other respective one of said first mentioned means, to measure the angles of rotation of the longitudinal center lines of said respective first mentioned means, the axes of said protractors passing through the intersections respectively of the longitudinal center lines of said connecting section and said respective first mentioned means.

11. In an instrument according to claim 1, a protractor and an index, secured one to one of said elements and one to the adjacent one of said first mentioned means, another protractor and an index secured one to the other of said elements and one to the other of said first mentioned means for measuring the respective true angle between said first mentioned means and said connecting section.

12. In an instrument according to claim 1, a protractor and an index at each of the intersections of the longitudinal center lines of said connecting section and said first mentioned means respectively for measuring the vertical angle of the longitudinal center line of said first mentioned means respectively, a protractor and an index at each of said intersections for measuring the horizontal angle of said first mentioned means respectively, a protractor and an index at each of said intersections for measuring the angles of rotation of said first mentioned means respectively, a protractor and an index substantially at each of said intersections for measuring the true angle between said first mentioned means and said connecting section respectively, a protractor on one of the elements of said connecting sections and an index on the other element for measuring the angle of twist of said connecting section and a scale associated with one of said telescoping elements and an index associated with the other for measuring the length of said connecting section.

PETE F. GARDNER.

REFERENCES CITED

The following references are of record in the file of this patent:

UNITED STATES PATENTS

| Number | Name | Date |
| --- | --- | --- |
| 1,134,106 | Clarke | Apr. 6, 1915 |
| 1,182,487 | Huebner | May 9, 1916 |
| 1,526,619 | Williams | Feb. 17, 1925 |
| 1,615,668 | Anderson | Jan. 25, 1927 |
| 1,949,007 | Butler | Feb. 27, 1934 |
| 2,095,059 | Donnelly | Oct. 5, 1937 |
| 2,431,100 | Woods | Nov. 18, 1947 |
| 2,433,889 | Bryant | Jan. 6, 1948 |

FOREIGN PATENTS

| Number | Country | Date |
| --- | --- | --- |
| 128,677 | Germany | 1902 |
| 347,410 | Germany | Jan. 18, 1922 |